US011049509B2

(12) United States Patent
Mukund et al.

(10) Patent No.: US 11,049,509 B2
(45) Date of Patent: Jun. 29, 2021

(54) VOICE SIGNAL ENHANCEMENT FOR HEAD-WORN AUDIO DEVICES

(71) Applicant: Plantronics, Inc., Santa Cruz, CA (US)

(72) Inventors: Shridhar K Mukund, San Jose, CA (US); Pamornpol Jinachitra, Bangkok (TH)

(73) Assignee: PLANTRONICS, INC., Santa Cruz, CA (US)

( * ) Notice: Subject to any disclaimer, the term of this patent is extended or adjusted under 35 U.S.C. 154(b) by 203 days.

(21) Appl. No.: 16/294,827

(22) Filed: Mar. 6, 2019

(65) Prior Publication Data

US 2020/0286500 A1  Sep. 10, 2020

(51) Int. Cl.
*G10L 21/028* (2013.01)
*G10L 21/0232* (2013.01)
(Continued)

(52) U.S. Cl.
CPC ........ *G10L 21/028* (2013.01); *G10L 21/0232* (2013.01); *G10L 25/84* (2013.01);
(Continued)

(58) Field of Classification Search
USPC ..................................................... 704/1–504
See application file for complete search history.

(56) References Cited

U.S. PATENT DOCUMENTS 6,618,485 B1  9/2003  Matsuo
6,879,952 B2  4/2005  Acero et al.
(Continued)

FOREIGN PATENT DOCUMENTS

CN  106504763 A  3/2017
GB  2236640 A  4/1991
(Continued)

OTHER PUBLICATIONS

Korean Intellectual property Office, PCT/US2012/034570 International Search Report, dated Nov. 16, 2012 (Nov. 16, 2012).
(Continued)

*Primary Examiner* — Marcus T Riley
(74) *Attorney, Agent, or Firm* — Slayden Grubert Beard PLLC

(57) ABSTRACT

A head-worn audio device is provided with a circuit for voice signal enhancement. The circuit comprises at least a plurality of microphones, arranged at predefined positions, where each microphone provides a microphone signal. The circuit further comprises a directivity pre-processor and a blind source separation processor. The directivity pre-processor is connected with the plurality of microphones to receive the microphone signals and being configured to provide at least a voice signal and a noise signal. Directivity pre-processing increases the mutual independence of the signals provided to the blind source separation processor and thus improves processing by blind source separation. The blind source separation processor receives at least the voice signal and the noise signal, and is configured to conduct blind source separation on at least the voice signal and the noise signal to provide at least an enhanced voice signal with reduced noise components.

19 Claims, 7 Drawing Sheets

(51) Int. Cl.
*G10L 25/84* (2013.01)
*H04M 1/60* (2006.01)
*H04M 1/40* (2006.01)
*H04R 3/00* (2006.01)
*H04R 1/40* (2006.01)

(52) U.S. Cl.
CPC .......... *H04M 1/6058* (2013.01); *H04R 1/406* (2013.01); *H04R 3/005* (2013.01); *H04M 2201/40* (2013.01)

(56) References Cited

U.S. PATENT DOCUMENTS

| | | | |
|---|---|---|---|
| 7,343,187 B2 | 3/2008 | Stetson | |
| 7,464,029 B2* | 12/2008 | Visser | G10L 21/0272 704/210 |
| 7,813,923 B2 | 10/2010 | Acero et al. | |
| 7,983,907 B2* | 7/2011 | Visser | G10L 21/0208 704/227 |
| 8,897,455 B2* | 11/2014 | Visser | G10L 21/0208 381/56 |
| 9,025,782 B2* | 5/2015 | Visser | H04R 3/005 381/57 |
| 9,100,734 B2 | 8/2015 | Visser | |
| 9,113,240 B2* | 8/2015 | Ramakrishnan | H04R 3/005 |
| 2001/0037195 A1 | 11/2001 | Acero et al. | |
| 2005/0005025 A1 | 1/2005 | Harville et al. | |
| 2005/0074129 A1 | 4/2005 | Fan | |
| 2005/0281410 A1 | 12/2005 | Grosvenor et al. | |
| 2006/0072767 A1 | 4/2006 | Zhang et al. | |
| 2006/0210096 A1 | 9/2006 | Stokes, III et al. | |
| 2007/0021958 A1* | 1/2007 | Visser | G10L 21/0272 704/226 |
| 2008/0201138 A1* | 8/2008 | Visser | G10L 21/0208 704/227 |
| 2009/0003623 A1 | 1/2009 | Burnett | |
| 2009/0003640 A1 | 1/2009 | Burnett | |
| 2009/0010449 A1 | 1/2009 | Burnett | |
| 2009/0010450 A1 | 1/2009 | Burnett | |
| 2009/0010451 A1 | 1/2009 | Burnett | |
| 2009/0055170 A1 | 2/2009 | Nagahama | |
| 2009/0106021 A1 | 4/2009 | Zurek et al. | |
| 2009/0116661 A1 | 5/2009 | Hetherington | |
| 2009/0238377 A1* | 9/2009 | Ramakrishnan | G10L 21/028 381/92 |
| 2010/0081466 A1 | 4/2010 | Mao | |
| 2010/0098266 A1 | 4/2010 | Mukund et al. | |
| 2010/0130198 A1 | 5/2010 | Kannappan et al. | |
| 2011/0040397 A1 | 2/2011 | Kraemer et al. | |
| 2012/0020485 A1* | 1/2012 | Visser | H04R 3/005 381/57 |
| 2012/0051548 A1* | 3/2012 | Visser | G10L 21/0208 381/56 |
| 2012/0057717 A1* | 3/2012 | Nystrom | H04R 3/005 381/71.6 |
| 2012/0269332 A1 | 10/2012 | Mukund | |
| 2014/0341407 A1 | 11/2014 | Fischer et al. | |
| 2018/0033447 A1 | 2/2018 | Ramprashad et al. | |
| 2018/0350381 A1 | 12/2018 | Bryan et al. | |
| 2020/0286500 A1* | 9/2020 | Mukund | G10L 21/028 |

FOREIGN PATENT DOCUMENTS

| | | |
|---|---|---|
| JP | 2008271067 A | 11/2008 |
| KR | 2010072746 A | 7/2010 |

OTHER PUBLICATIONS

Ganesh R. Naik; Wenwu Wang, editors "Chapter 10: Statistical Analysis and Evaluation of Blind Speech"; *Blind Source Separation: Advances in Theory, Algorithms and Applications*, 2014, pp. 291-322, Springer-Verkag.

Ganesh R. Naik; Wenwu Wang, editors "Chapter 11: Speech Separation and Extraction by Combining Superdirective Beamforming and Blind Source Separation", *Blind Source Separation: Advances in Theory, Algorithms and Applications*, 2014, pp. 323-348, Springer-Verkag.

International Search Report and Written Opinion dated May 12, 2020 for International Application No. PCT/US2020/020820, 13 pages.

* cited by examiner

VOICE SIGNAL ENHANCEMENT FOR HEAD-WORN AUDIO DEVICES

FIELD

The present disclosure relates generally to the field of head worn audio devices. More particularly, the present disclosure relates to providing an improved voice signal of a user's voice, captured with a plurality of microphones.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Mobile communication devices having audio recording capabilities are ubiquitous today for various applications. Most prominently, smart phones, tables, and laptops allow placing audio and video call and enable communications with unprecedented quality. Similarly ubiquitous is the use of head-worn audio devices, such as in particular headsets. Headsets allow 'hands-free' operation and are thus being employed in commercial applications, office environments, and while driving.

An issue with the mobility of modern communication devices relates to the fact that the devices can be brought almost anywhere, which may lead to use in loud environments. In these environments, a common problem is that the microphone picks up on the environmental noise in a substantial way, making the user's voice hard to understand by the receiver of the call. The problem is particularly prominent with background noise comprising speech of other persons as voice band filtering in such scenarios cannot remove such noise to a satisfactory extent.

Thus, an object exists to improve the quality of a voice signal, in particular in noisy environments.

SUMMARY

In general and in one aspect, a head-worn audio device having a circuit for voice signal enhancement is provided. The circuit comprising at least a plurality of microphones, arranged at predefined positions, where each microphone provides a microphone signal; a directivity pre-processor, connected with the plurality of microphones to receive the microphone signals and configured to provide at least a voice signal and a noise signal; a blind-source-separation (BSS) processor, connected with the directivity pre-processor to receive at least the voice signal and the noise signal, and being configured to conduct blind source separation on at least the voice signal and the noise signal to provide at least an enhanced voice signal with reduced noise components.

One basic idea of the invention relates to the use of blind source separation to provide the enhanced voice signal. As the inventors of the instant application have ascertained, blind source separation works best if the signals, provided to a blind source separation algorithm are mutually linearly independent. While in practice, signals of microphones placed in a vicinity of each other are typically not linearly independent, the present invention proposes to use directivity pre-processing to increase the independence of the signals provided to the blind source separation algorithm and thus to improve processing by blind source separation.

In another aspect, a circuit for voice signal enhancement is provided, the circuit being connectable to a plurality of microphones, where each microphone provides a microphone signal. The circuit comprises at least a directivity pre-processor, connected with the plurality of microphones to receive the microphone signals and configured to provide at least a voice signal and a noise signal; and a BSS processor, connected with the directivity pre-processor to receive at least the voice signal and the noise signal, and being configured to conduct blind source separation on at least the voice signal and the noise signal to provide at least an enhanced voice signal with reduced noise components.

In another aspect, a method of voice signal enhancement is provided, based on a plurality of microphone signals of a plurality of microphones. The method comprises directivity pre-processing of the plurality of microphone signals to obtain at least a voice signal and a noise signal; and conducting blind source separation on at least the voice signal and the noise signal to obtain at least an enhanced voice signal with reduced noise components.

The details of one or more embodiments are set forth in the accompanying drawings and the description below. Other features will be apparent from the description, drawings, and from the claims.

DETAILED DESCRIPTION

Figure 1:
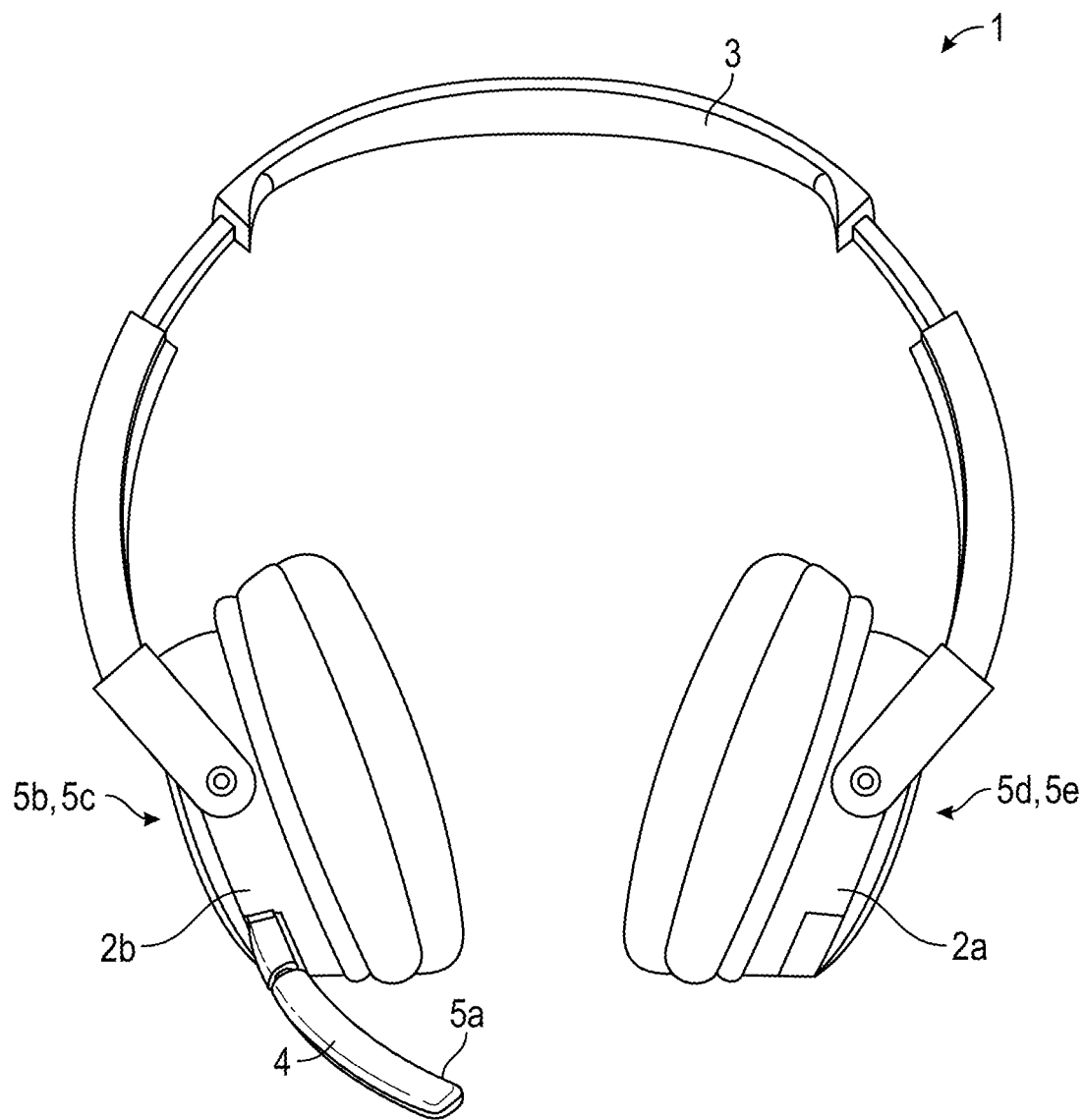
FIG. 1 shows a front view of an embodiment of a head-worn audio device.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In the following explanation of the present invention according to the embodiments described, the terms "connected to" or "connected with" are used to indicate a data and/or audio (signal) connection between at least two components, devices, units, processors, or modules. Such a connection may be direct between the respective components, devices, units, processors, or modules; or indirect, i.e., over intermediate components, devices, units, processors, or modules. The connection may be permanent or temporary; wireless or conductor based.

For example, a data and/or audio connection may be provided over direct connection, a bus, or over a network connection, such as a WAN (wide area network), LAN (local area network), PAN (personal area network), BAN (body area network) comprising, e.g., the Internet, Ethernet networks, cellular networks, such as LTE, Bluetooth (classic, smart, or low energy) networks, DECT networks, ZigBee networks, and/or Wi-Fi networks using a corresponding suitable communications protocol. In some embodiments, a USB connection, a Bluetooth network connection and/or a DECT connection is used to transmit audio and/or data.

In the following description, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between like-named elements. For example, a first element is distinct from a second element, and the first element may encompass more than one element and succeed (or precede) the second element in an ordering of elements.

As communication devices gain mobility, a need exists to allow proper communication with such a device irrespective of the environment of the user. Thus, it is desirable to enable clear communications also in noisy environments, such as near a busy road, while travelling, and in shared office environments, restaurants, etc. A particular issue is given when the noise environments comprises speech or talk of other persons and in particular "single distractor speech" from a specific unknown direction, which may decrease the ability of typical noise reduction systems, for example employing frequency band filtering. The present invention aims at enabling communications in the aforementioned noisy environments.

In one aspect, a head-worn audio device having a circuit for voice signal enhancement, is provided. According to this aspect, the circuit comprises at least a plurality of microphones, a directivity pre-processor, and a blind-source-separation processor, also referred to as "BSS processor" in the following.

The plurality of microphones of the present exemplary aspect are arranged as part of the audio device at predefined positions. The predefined positioning as part of the audio device may in an embodiment result in a substantially predefined positioning relative to a user's mouth, when the user is wearing the headset as intended or designed.

In some embodiments, the head-worn audio device is configured so that a substantially predefined orientation and/or positioning relative to the user's head and/or the user's mouth results when the user is wearing the audio device as intended or designed. For example, the head-worn audio device may be provided with a 'default' orientation and/or positioning, like the intended orientation of a typical headset or the intended positioning of typical glasses, so that it is at least likely that the user wears the head-worn audio device with the default orientation/positioning, which may be relied upon.

It is noted that a 'predefined' or 'fixed' positioning of some of the microphones encompasses setups, where the exact positioning of the respective microphone relative to a user's mouth, may vary slightly. For example, when a user dons the audio device, doffs the audio device, and dons the audio device again, it will be readily understood that a slight positioning change relative to the user's mouth easily may occur between the two 'wearing sessions'. Also, the relative positioning of the respective microphone to the mouth may differ from one user to another. This nevertheless means that at a given time, e.g., in one given 'wearing session' of the same user, the microphones have a fixed relative position.

In some embodiments, at least one microphone is arranged on a microphone boom that can be adjusted in a limited way. Typically, such arrangement is considered to be predefined, in particular when the boom only provides a limited adjustment, since the microphone stays relatively close to the user's mouth in any event.

The microphones may be of any suitable type, such as dynamic, condenser, electret, ribbon, carbon, piezoelectric, fiber optic, laser, or MEMS type. At least one of the microphones is arranged so that it captures the voice of the user, wearing the audio device. One or more of the microphones may be omnidirectional or directional. Each microphone provides a microphone signal to the directivity pre-processor, either directly or indirectly via intermediate components. In some embodiments, at least some of the microphone signals are provided to an intermediate circuit, such as a signal conditioning circuit, connected between the respective microphone and the directivity pre-processor for one or more of, e.g., amplification, noise suppression, and/or analog-to-digital conversion.

The directivity pre-processor is configured to receive the microphone signals and to provide at least a voice signal and a noise signal to the BSS processor from the received microphone signals. In the present context, the terms "voice signal" and "noise signal" are understood as an analog or digital representation of audio in time or frequency domain, wherein the voice signal comprises more of the user's voice, compared to the noise signal, i.e., the energy of the user's voice in the voice signal is higher, compared to the noise signal. The voice signal may also be referred to as a "mostly voice signal", while the noise signal may also be referred to as a "mostly noise signal". The term "energy" is understood herein with its usual meaning, namely physical energy. In a wave, the energy is generally considered to be proportional to its amplitude squared.

The blind source separation (BSS) processor is connected with the directivity pre-processor to receive at least the voice signal and the noise signal. The BSS processor is configured to execute a blind source separation algorithm on at least the voice signal and the noise signal and to provide at least an enhanced voice signal with reduced noise components. In this context, the term "blind source separation", also referred to as "blind signal separation", is understood with its usual meaning, namely, the separation of a set of source signals (signal of interest, i.e., voice signal, and noise signal) from a set of mixed signals, without the aid of information or with very little information about the source signals or the mixing process. Details of Blind Source Separation can be found in Blind Source Separation—Advances in Theory, Algorithms, and Applications, Ganesh R. Naik, Wenwu Wang, Springer Verlag, Berlin, Heidelberg, 2014, incorporated by reference herein.

The enhanced voice signal, provided by the blind source separation processor may then be provided to another component of the audio device for further processing. In some embodiments, the enhanced voice signal is provided to a communication module for transmission to a remote recipient. In other embodiments, the enhanced voice signal is provided to a recording unit for at least temporary storage. The head-worn audio device may be considered a speech recording device in this case.

The directivity pre-processor and the BSS processor may be of any suitable type. For example and in some embodiments, the directivity pre-processor and/or the BSS processor may be provided in corresponding dedicated circuitry, which may be integrated or non-integrated. Alternatively and in some embodiments, the directivity pre-processor and/or the BSS processor may be provided in software, stored in a memory of the audio device, and their respective functionalities is provided when the software is executed on a common or one or more dedicated processing devices, such as a CPU, microcontroller, or DSP.

The audio device in further embodiments certainly may comprise additional components. For example, the audio device in one exemplary embodiment may comprise additional control circuitry, additional circuitry to process audio, a wireless communications interface, a central processing unit, one or more housings, and/or a battery.

The term "signal" in the present context refers to an analog or digital representation of audio as electric signals. For example, the signals described herein may be of pulse code modulated (PCM) type, or any other type of bit stream signal. Each signal may comprise one channel (mono signal), two channels (stereo signal), or more than two channels (multichannel signal). The signal(s) may be compressed or not compressed.

In some embodiments, the directivity pre-processor is configured to generate a plurality of voice candidate signals and a plurality of noise candidate signals from the microphone signals.

According to the present embodiments, so-called "candidate signals" are generated from the microphone signals. As will be discussed in the following in more detail and in some embodiments, the voice signal and the noise signal, provided by the directivity pre-processor to the BSS processor, are selected from the candidate signals.

In some embodiments, each of the candidate signals corresponds to a predefined microphone directivity, which microphone directivity may be predefined by the respectively predefined or fixed microphone positions. In some embodiments, the candidate signals have a unique directivity, i.e., not two of the noise candidate signals and not two of the voice candidate signals have the same directivity.

The term "directivity" or "spatial directivity" in some embodiments may be based on microphone directionality (omnidirectional or directional) considering the respective microphone's position. Alternatively or additionally, and in some embodiments, a desired microphone directivity may also be created by multiple microphone processing, i.e., by using multiple microphone signals. In both cases, the microphone directivity defines a three-dimensional space or "subspace" in the vicinity of the respective microphone(s), where the microphone(s) is/are highly sensitive.

In some embodiments, the directivity pre-processor comprises a microphone definition database and a spatial directivity module to generate the plurality of the voice candidate signals and the plurality of the noise candidate signals.

In the present embodiments, the microphone definition database comprises at least information referring to the positioning of each of the microphones, relative to the audio device, and thus, e.g., relative to the user's head or mouth at least when wearing the device as intended. The microphone definition database may comprise further microphone-related data, such as microphone type, directionality pattern, etc. The microphone definition database may be of any suitable type and, e.g., comprise suitable memory.

The spatial directivity module may be of any suitable type to generate the candidate signals. The spatial directivity module may be provided in corresponding dedicated circuity, which may be integrated or non-integrated. Alternatively and in some embodiments, the spatial directivity module may be provided in software, stored in a memory of the audio device, and their respective functionalities is provided when the software is executed on a common or one or more dedicated processing devices, such as a CPU, microcontroller, or DSP.

For example, the spatial directivity module may be configured to generate the voice candidate signals based on the respective microphone's positioning and directivity. In this example, the microphone definition database may provide that one or more of the microphones are close to the user's mouth during use or a pointed towards the user's mouth. The spatial directivity module may then provide the corresponding microphone signals as voice candidate signals.

In some embodiments, the spatial directivity module may be configured as a beamformer to provide candidate signals with a correspondingly defined directivity.

In some embodiments, the spatial directivity module uses two or more of the microphone signals to generate a plurality of candidate signals therefrom. As will be apparent to one skilled in the art, having two microphones at known positions, it is for example possible to generate four candidate signals, each having a unique directivity or "beam form". The number of candidate signals is not limited. The spatial directivity module in some embodiments may be configured with one of the following algorithms to generate the candidate signals, which algorithms are known to a skilled person:
  Delay-sum;
  Filter-sum;
  Time-frequency amplitude and delay source grouping/clustering.

In some embodiments, the directivity pre-processor is further configured to equalize and/or normalize at least one of the voice candidate signals and the noise candidate signals. In some embodiments at least one of the plurality of voice candidate signals and the plurality of noise candidate is equalized and/or normalized.

An equalization and normalization, respectively, provides that each candidate signal of the respective plurality or group of candidate signals has at least an approximately similar level and frequency response. It is noted that while it is possible in some embodiments to conduct the equalization/normalization over all of the candidate signals, in some other embodiments, an equalization/normalization is conducted per group, i.e., the voice candidate signals on the one hand, and the noise candidate signals on the other hand. This group-wise equalization and/or normalization may be sufficient to the later selection of one of the voice candidate signals as the voice signal and the selection of one of the noise candidate signals as noise signals.

Suitable equalization and normalization methods include a typical EQ, a dynamic EQ, and an automatic gain control.

With respect to the noise candidate signals and/or the voice candidate signals and in some embodiments, the equalization and/or normalization is conducted with respect to diffused speech-like noise, e.g., using Hoth Noise and/or ITU-T G.18 composite source signal (CSS) noise.

In some embodiments, the equalization and/or normalization is based on a set of parameters, derived during manufacturing or design of the head-worn audio device. In other words, based on a set of calibration parameters. In some embodiments, the directivity pre-processor comprises one or more suitable equalization and/or normalization circuits.

In some embodiments, the directivity pre-processor further comprises a voice candidate selection circuit, wherein the voice candidate selection circuit selects one of the voice candidate signals as the voice signal and provides the voice signal to the BSS processor.

The selection circuit may be configured with any suitable selection criterium to select the voice signal from the voice candidate signals. In one example, a speech detector is provided to analyze each voice candidate signal and to provide a speech detection confidence score. The voice candidate signal that has received the highest or maximum confidence is selected as voice signal.

In some embodiments, the voice candidate selection circuit is configured to determine an energy of each of the voice candidate signals and selects the voice candidate signal having the lowest energy as the voice signal. In the context of this explanation and as discussed in the preceding, the term "energy" is understood with its usual meaning, namely physical energy. In a wave, the energy of the wave is generally considered to be proportional to its amplitude squared. Since each candidate signal corresponds to acoustic waves are captured by one or more of the microphones, the energy of each of the voice candidate signals corresponds to the sound pressure of these underlying acoustic waves. Thus, "energy" also is referred to as "acoustic energy" or "wave energy" herein.

The present embodiment is based on the recognition of the inventors of the instant invention that a signal having a relatively clear voice component generally will have a low energy.

In some embodiments, the voice candidate selection circuit is configured to determine the energy of each of the voice candidate signals in a plurality of sub-bands. For example, a typical 12 kHz voice band may be divided into 32 equal sub-bands and the voice candidate selection circuit may determine the energy for each of the sub-band. The overall energy may in that case be determined by forming an average, median, etc. In some embodiments, a predefined weighing is applied that is specific to voice characteristics.

In some embodiments, the directivity pre-processor further comprises a voice activity detector wherein the voice candidate selection circuit selects one of the voice candidate signals as the voice signal if the voice activity detector determines the presence of the user's voice.

The voice activity detector (VAD) is operable to perform speech processing on, and to detect human speech within, the noise suppressed input signals. The voice activity detector comprises corresponding filters to filter non-stationary noise from the microphone signals. This enhances the speech processing. The voice activity detector estimates the presence of human speech in the audio received at the microphones.

With respect to the processing of the noise candidate signals and in some embodiments, the directivity pre-processor further comprises a voice filter, configured to filter voice components from each of the noise candidate signals. The voice filter may in some embodiments comprise a parametric filter, set for voice filtering.

In some embodiments, the voice filter is configured to receive at least one of the voice candidate signals and to filter the voice components using the received at least one voice candidate signal. The present embodiments are based on the recognition that an effective removal of voice components from the noise candidate signals is possible by applying a subtractive filter using the at least one voice candidate signal as input to the filter. In some embodiments, the voice signal is used to filter the voice components from the noise candidates.

In some embodiments, the directivity pre-processor further comprises a noise candidate selection circuit, wherein noise candidate selection circuit selects one of the noise candidate signals as the noise signal and provides the noise signal to the BSS processor.

The noise candidate selection circuit may be configured with any suitable selection criterium to select the noise signal from the noise candidate signals. In one example, the noise candidate selection circuit determines a voice energy in each of the noise candidate signals and selects the noise candidate signal having the least voice energy as noise signal.

In some embodiments, the noise candidate selection circuit is configured to determine an energy of each of the noise candidate signals and selects the noise candidate signal having the highest energy as the noise signal. The present embodiment is based on the recognition of the inventors of the instant invention that a signal having a high noise component generally will have a high energy.

In some embodiments, the noise candidate selection circuit is configured to determine the energy of each of the noise candidate signals in a plurality of sub-bands. For example, a typical 12 kHz voice band may be divided into 32 equal sub-bands and the noise candidate selection circuit may determine the energy for each of the sub-band. The overall energy may in that case be determined by forming an average, median, etc. In some embodiments, a predefined weighing is applied that is specific to noise characteristics.

In some embodiments, the BSS processor is configured to additionally provide an enhanced noise signal with reduced voice components. The enhanced noise signal may be beneficial as it allows further analysis of the noise environment of the user, e.g., for acoustic safety purposes. In some embodiments, the enhances noise signal is provided to a remote analysis server to determine the noise exposure of the user.

In some embodiments, the head-worn audio device is a hat, a helmet, (smart) glasses, or a cap.

In some embodiments, the head-worn audio device is a headset.

In the context of this application, the term "headset" refers to all types of headsets, headphones, and other head worn audio playback devices, such as for example circum-aural and supra-aural headphones, ear buds, in ear headphones, and other types of earphones. The headset may be of mono, stereo, or multichannel setup. The headset in some embodiments may comprise an audio processor. The audio processor may be of any suitable type to provide output audio from an input audio signal. For example, the audio processor may be a digital sound processor (DSP).

In some embodiments, the audio device comprises at least three microphones. In some embodiments, the audio device comprises at least 5 microphones. Depending on the application, an increased number of microphones may improve the discussed functionality of the audio device further.

In some embodiments, the audio device comprises an audio output to transmit at least the enhanced voice signal to a further device. For example, the audio output may be provided as a wireless communication interface, so that the enhanced voice signal may be provided to the further device. The latter for example may be a phone, smart phone, smart watch, laptop, tablet, computer. It is noted that in some embodiments, the audio output may allow for a wire-based connection.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

FIG. 1 shows a front view of an embodiment of a head-worn audio device, namely in this embodiment a headset 1. The headset 1 comprises two earphone housings 2a, 2b, which are formed with respective earphone speakers 6a, 6b (not shown in FIG. 1) to provide an audio output to a user during operation, i.e., when the user is wearing the headset 1. The two earphones 2a, 2b are connected with each other over via an adjustable head band 3. The headset 1 further comprises a microphone boom 4 with a microphone 5a attached at its end. Further microphones 5b, 5c, 5d, and 5e are provided in the earphone housings 2a, 2b. The microphones 5a-5e allow for voice signal enhancement and noise reduction, as will be discussed in the following in more detail. It is noted that the number of microphones may vary depending on the application.

The headset 1 allows for a wireless connection via Bluetooth to a further device, e.g., a mobile phone, smart phone, tablet, computer, etc., in a usual way, for example for communication applications.

Figure 2:
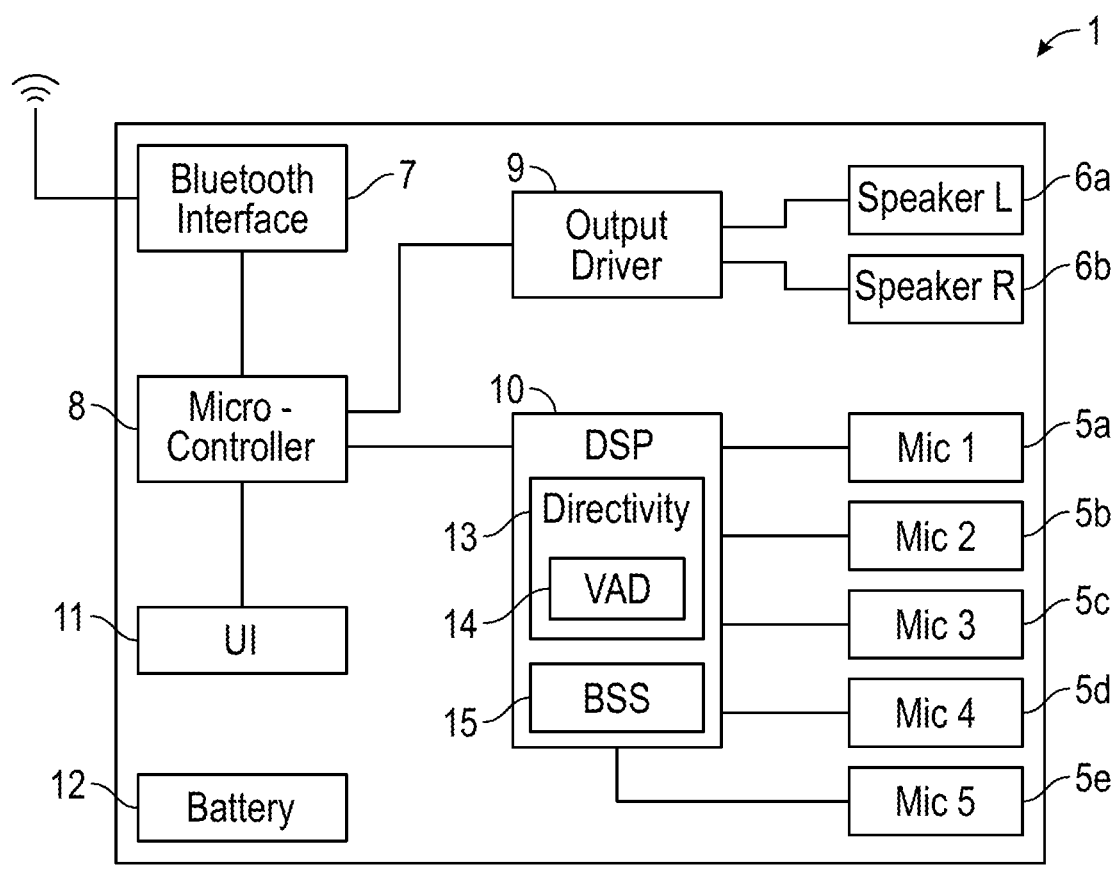
FIG. 2 shows a schematic block diagram of the head-worn audio device of FIG. 1.

FIG. 2 shows a schematic block diagram of the headset 1. Besides the already mentioned speakers 6a, 6b and the microphones 5a-5e, the headset 1 comprises a Bluetooth interface 7 for connection with the aforementioned further device. A microcontroller 8 is provided to control the connection with the further device. Incoming audio from the further device is provided to output driver circuitry 9, which comprises a D/A converter, and an amplifier. Audio, captured by the microphones 5a-5e is processed by a digital signal processor (DSP) 10, as will be discussed in further detail in the following. An enhanced voice signal and an enhanced noise signal is provided by the DSP 10 to the microcontroller 8 for transmission to the further device.

In addition to the above components, a user interface 11 allows the user to adjust settings of the headset 1, such as ON/OFF state, volume, etc. Battery 12 supplies operating power to all of the aforementioned components. It is noted that no connections from and to the battery 12 are shown so as to not obscure the FIG. All of the aforementioned components are provided in the earphone housings 2a, 2b.

Headset 1 according to the present embodiment is particularly adapted for operation in noisy environments and to allow the user's voice to be well captured even in an environment having so-called "single distractor speech". Accordingly, DSP 10 is configured to provide an enhanced voice signal with reduced noise components to the microcontroller 8 for transmission to the further device via the Bluetooth interface 7. DSP 10 also provides an enhanced noise signal to the microcontroller 8. The enhanced noise signal allows an analysis of the noise environment of the user for acoustic safety purposes.

The operation of DSP 10 is based on blind source separation (BSS). Consequently, the DSP 10 comprises a BSS processor 15. Blind source separation is a known mathematical premise for signal processing, which provides that if N sources of audio streams are mixed and captured by N microphones (N mixtures), then it is possible to separate the resulting mixtures into N original audio streams. A discussion of blind source separation can be found in Blind Source Separation—Advances in Theory, Algorithms, and Applications, Ganesh R. Naik, Wenwu Wang, Springer Verlag, Berlin, Heidelberg, 2014, incorporated by reference herein.

However, the results of BSS generally have been insufficient if the N mixtures are not mutually linearly independent. In a headset or other head-worn device application, it is known that the desired voice/speech emanates from a specific direction relative to the microphones. However, the direction of noise is generally not known. Noise is most annoying when it is a so-called "single distractor speech", in particular when it originates from a specific unknown direction.

In the present embodiment, the DSP 10 thus comprises a directivity pre-processor 13 with a voice activity detector (VAD) 14. Voice activity detection is a well-known technique. The directivity pre-processor 13 pre-processes the microphone signals of microphones 5a-5e and provides a voice signal and a noise signal to the BSS processor 15. This pre-processing serves to improve the functioning of the BSS processor 715 and to alleviate the fact that the direction of the noise is not known. The voice activity detector 14 is operable to perform speech processing on, and to detect human speech within, the noise suppressed input signals. VAD 14 comprises corresponding internal filters (not shown) to filter non-stationary noise from the noise suppressed input signals. This enhances the speech processing. VAD 14 estimates the presence of human speech in the audio received at the microphones 5a-5e.

Figure 3:
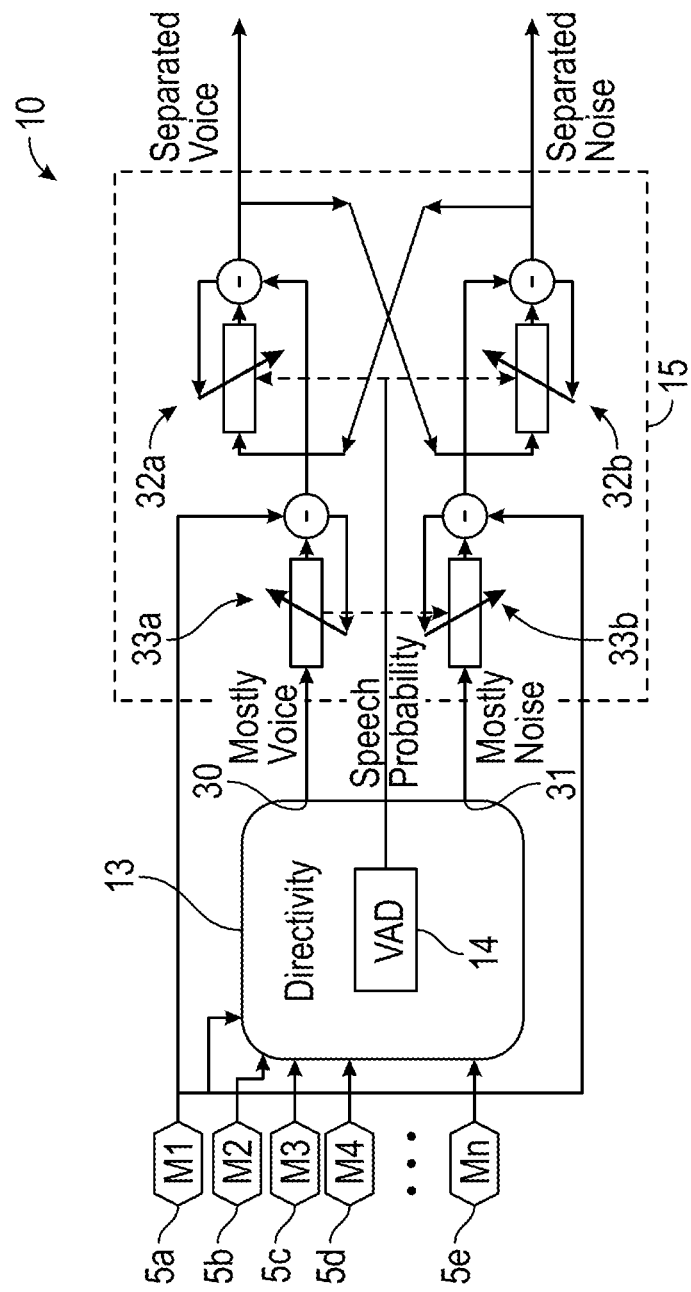
FIG. 3 shows a schematic block diagram of an embodiment of a digital signal processor.

FIG. 3 shows a schematic block diagram of an embodiment of DSP 10. It is noted that FIG. 3 shows microphone signals M1-Mn as inputs to the directivity module 13. The directivity pre-processor module 13 has a voice signal output 30 and a noise signal output 31. Both outputs 30, 31 are connected with the BSS processor module 15, which corresponds to a known setup of a blind source separation processor. Accordingly, the single components are only briefly discussed in the following.

The BSS processor module 15 comprises cross-coupled adaptive filters 32a, 32b, configured to operate in a recursive loop, as shown. The adaptive filters 32a, 32b thus improve operation over time in a statistical process by comparing the filtered signal with the originally provided (and properly delayed) signal.

Each signal path, i.e., the "mostly voice" and the "mostly noise" path, comprise an additional recursive, adaptive pre-filter 33a, 33b. The pre-filters 33a, 33b serve to restore the (voice/noise) fidelity of the respective voice and noise signal. This is done on the "voice processing side" by comparing the voice signal at output 30 of the directivity pre-processor 13 with the microphone signal, directly provided by microphone 5a, as shown. Since the microphone signal is not pre-processed, it is considered to have maintained true fidelity. Similarly and on the "noise processing side", the noise signal of output 31 is compared with the microphone signal 5a to restore true fidelity.

The term "fidelity" is understood with its typical meaning in the field of audio processing, denoting how accurately a copy reproduces its source. It is noted that microphone 5a may be of omnidirectional or directional type, depending on the application. Alternatively to the pre-filters 33a, 33b, true fidelity may be restored by using corresponding (fixed) equalizers.

Figure 5:
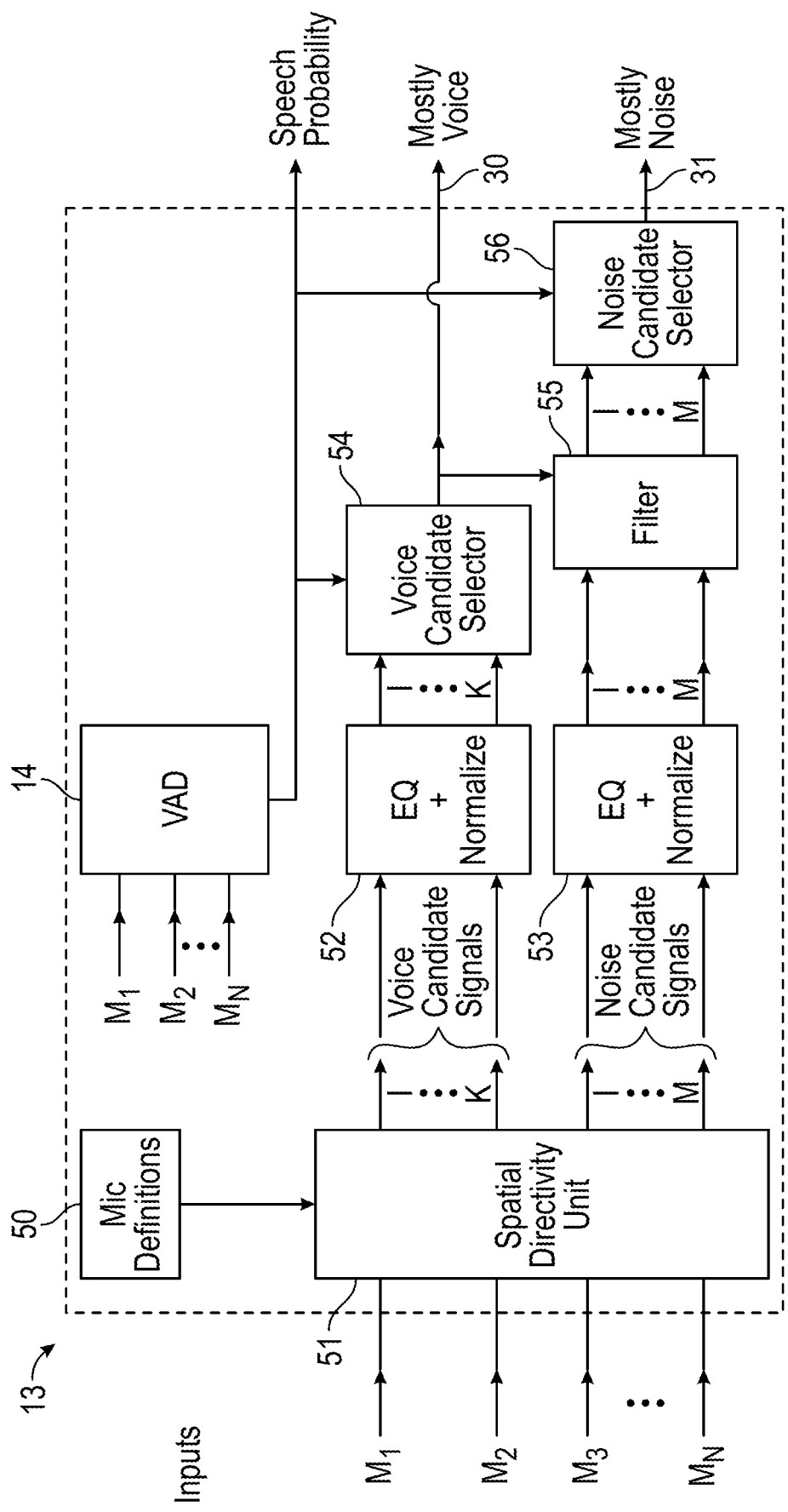
FIG. 5 shows a schematic exemplary block diagram of the processing by a directivity pre-processor as used in the embodiment of FIG. 1.

FIG. 5 shows a schematic exemplary block diagram of the processing by the directivity pre-processor 13. It is noted that in FIG. 5, the single components and lines are primarily provided for illustration purposes. In typical implementations, the functionality of one or more of the components may be provided by software, hardware, or combinations thereof.

Figure 6:
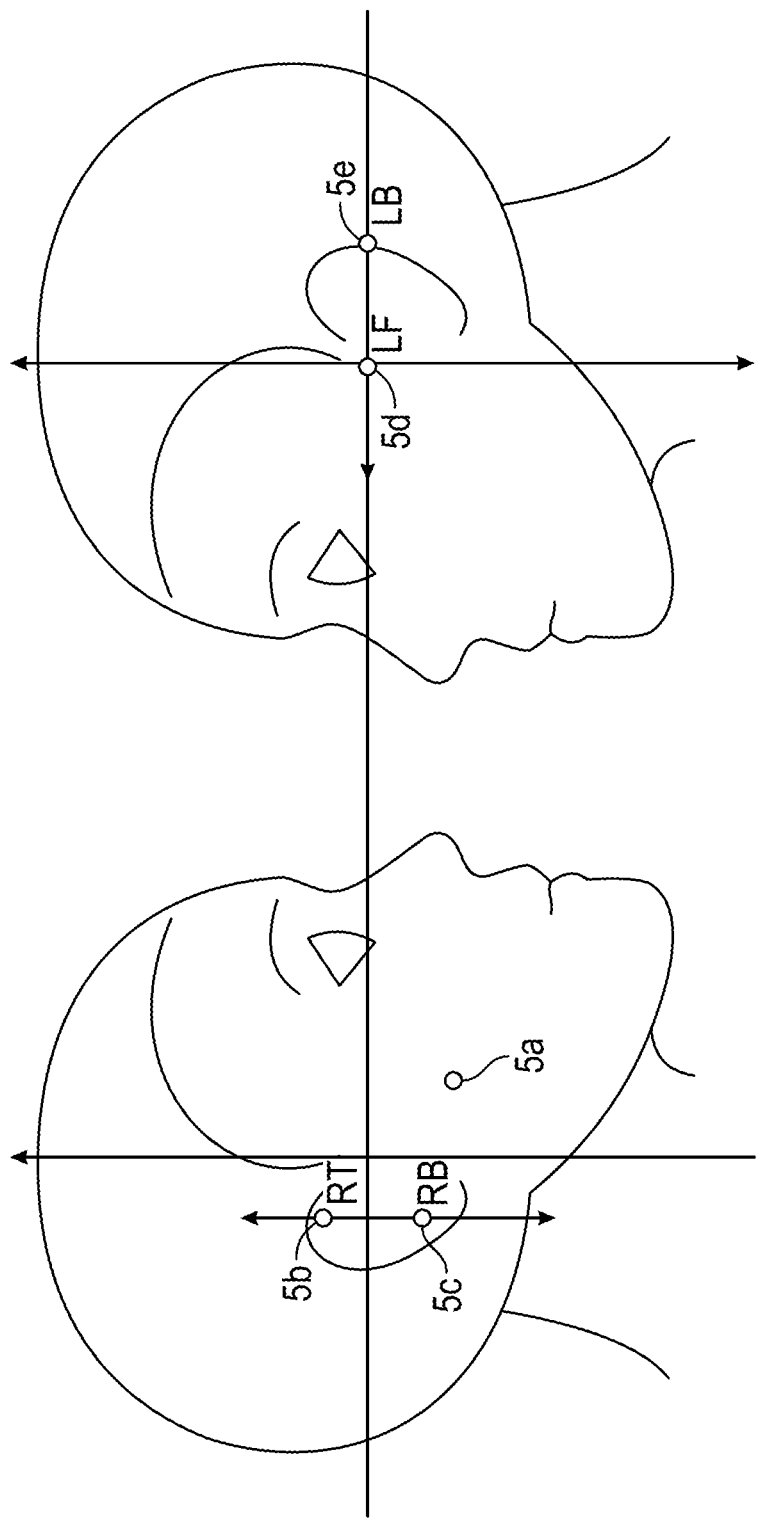
FIG. 6 illustrates exemplary microphone placement in the embodiment of FIG. 1.

The operation of the directivity pre-processor module 13 is based on the idea that with a head-worn audio device, such as headset 1, the point where the desired speech emanates during use relative to the microphones 5a-5e is at least roughly known a priori, i.e., by the design of the headset 1. Accordingly, for each of the microphones 5a-5e, the corresponding relative location and directionality pattern is pre-defined in microphone definition database 50. FIG. 6, by way of example, shows the positions of each of the microphones 5a-5e relative to the head of a user. For reasons of clarity, the other components of the headset 1 have been omitted in FIG. 6.

Microphone 5a is also referred to as the primary microphone. It is closest to the user's mouth during use. i.e., when wearing the headset 1. Microphone 5b is positioned on the right, top position (RT) and microphone 5c is positioned on the right, bottom position (RB). Microphone 5d is positioned on the left, front position (LF) and microphone 5e is positioned on the left, rear position (LR).

Reverting back to FIG. 5 and as will be apparent from the FIG., the number of N microphone signals $M_1$-$M_N$ are provided to spatial directivity unit 51 and to VAD 14. Relative location and directionality information of the microphones 5a-5e is provided by the database 50. The spatial directivity unit 51 uses the microphone signals $M_1$-$M_N$ and the information of database 50 to generate a number K of voice candidate signals and a number M of noise candidate signals. The number of voice candidate signals is independent from the number of noise candidate signals. Each of the candidate signals correspond to a defined "sub-space directivity". It is noted that the entire processing of the directivity pre-processor 13 and the BSS processor 15 is performed in the st-DFT (frequency) domain.

Figure 7:
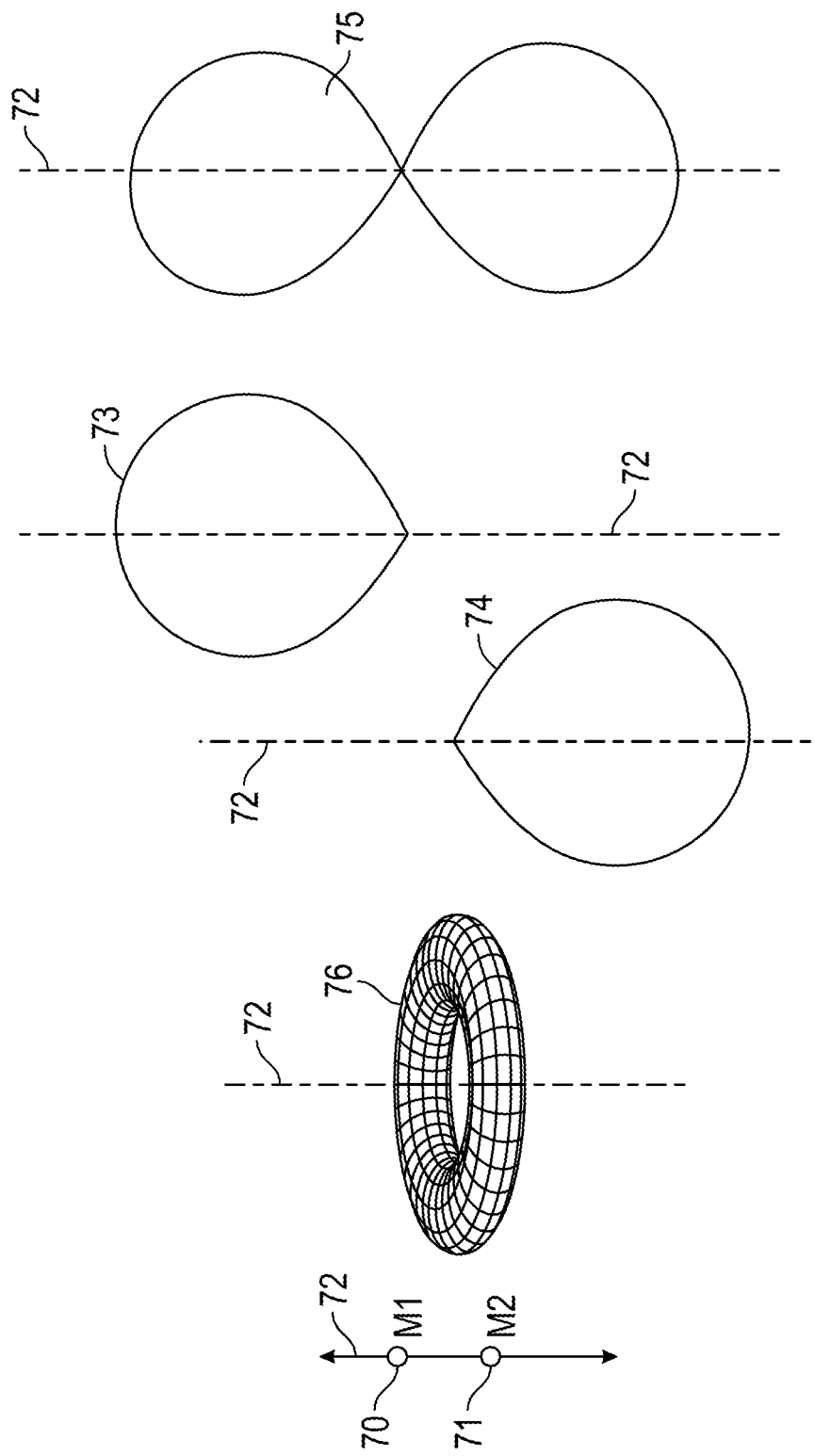
FIG. 7 illustrates exemplary beam forms of an arrangement of two microphones.

As will be apparent to one skilled in the art, having two microphones at known positions, it is for example possible to generate four candidate signals, each having a unique directivity or "beam form". FIG. 7 shows this in an exemplary embodiment with two microphones 70, 71, arranged on microphone axis 72. Different beam forms are indicated with reference numerals 73-76. While reference numerals 73 and 74 show single microphone beam form patterns, reference numeral 75 indicates a bi-directional beam form having a slightly narrower sub-space directivity in a direction, perpendicular to the microphone axis 72. Beam form pattern 76 shows a so-called "NULL" pattern, i.e., a toroid beam form.

The spatial directivity unit 51 provides the correspondingly formed voice and noise candidate signals to respective equalizer/normalizer units 52, 53. It is noted that while within the group of 1-K voice candidate signals, each voice candidate signals is based on a unique beam form and within the group of 1-M noise candidate signals, each noise candidate signal is based on a unique beam form, there may be overlap between the groups, since the source direction of the noise is unknown. For example, one formed candidate may be a voice candidate and also a noise candidate.

One of the voice candidate signals, i.e., voice candidate 1 is formed with a sub-space beam form that covers the position of the mouth of the user. This is possible due to the provision of the microphone details in database 50.

Equalizer/normalizer unit 52 equalizes and normalizes each voice candidate so that the voice component of the respective candidate signal has the same level and frequency response. The correspondingly processed candidate signals are provided to voice candidate selector circuit 54. The voice candidate selector 54 selects the voice candidate signal having the lowest energy. This candidate is provided as voice signal to the BSS processor module 15 via output 30. Voice candidate selector 54 is only active when the VAD 14 determines the presence of voice in the captured microphone signals.

For the selection, the voice candidate selector 54 determines the energy of for each of the voice candidate signals. The determination uses a typical voice band of 12 kHz and determines the energy for 32 equal sub-bands of 375 Hz. A weighing may be applied based on a voice frequency distribution profile. Accordingly, an emphasis may be put on those sub-bands, which are within typical human speech. The selected voice candidate is then provided as voice signal to the BSS processor module 15 via the voice signal output 30. In addition, the voice signal is provided to filter 55, as will be discussed in detail in the following.

Corresponding to the equalizer/normalizer unit 52 for the voice candidates, equalizer/normalizer 53 provides equalization and normalization for each of the noise candidate signals so that each respective candidate signal has the same level and frequency response. Equalizer/normalizer 53 adapts the level and frequency with respect to diffused speech-like noise, e.g., Hoth noise.

Each noise candidate signal is the processed by filter 55, which removes voice components from the noise candidate signals. Filter 55 is configured so as not to delay the signal.

Noise candidate selector 56 selects the noise candidate signal, which has the highest energy. Information on the presence or lack of voice, as determined by VAD 14, improves the selection. The selected noise candidate signal is provided as noise signal to the BSS processor module 15.

For the selection, the noise candidate selector 56 determines the energy of for each of the noise candidate signals. The determination uses a typical voice band of 12 kHz and determines the energy for 32 equal sub-bands of 375 Hz. A weighing may be applied based on a typical noise frequency distribution profile. The selected noise candidate is then provided to the BSS processor module 15 via the noise signal output 31.

Figure 4:
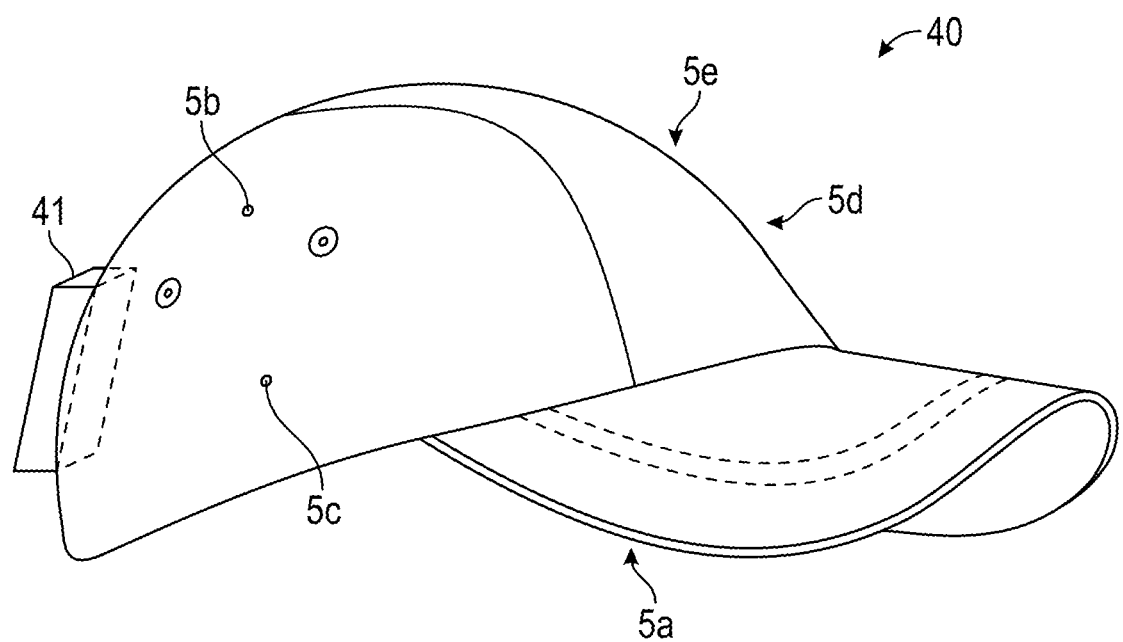
FIG. 4 shows a further embodiment of a head-worn audio device.

FIG. 4 shows a further embodiment of a head-worn audio device, namely a cap 40. The embodiment of FIG. 4, and in particular its operation, corresponds to the embodiment, discussed in the preceding, with the exception that cap 40 does not comprise speakers 6a, 6b and thus does not provide output audio to the user. Cap 40, corresponding to the preceding discussion, comprises microphones 5a-5e arranged at fixed positions relative to the cap 40 and to user's mouth when wearing the cap as intended. An electronics housing 41 is provided to accommodate the aforementioned electronics and in particular Bluetooth interface 7, microcontroller 8, DSP 10, user interface 11, and battery 12.

While the invention has been illustrated and described in detail in the drawings and foregoing description, such illustration and description are to be considered illustrative or exemplary and not restrictive; the invention is not limited to the disclosed embodiments. For example, it is possible to operate the invention in any of the preceding embodiments, wherein instead of the head-worn audio device being provided as a headset, the head-worn audio device being formed as smart glasses, a cap, a hat, a helmet, or any other type of head-worn device or clothing;

instead of Bluetooth interface 7, an interface is used that is adapted for communication via USB, DECT, Wi-Fi, LAN, QD, or a different type of analog or digital, wired or wireless connection, the output driver 9 comprises noise cancellation circuitry for the output audio; and/or instead of the five microphones shown in FIGS. 1 and 2, a higher or lower number of microphones is used.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A head-worn audio device having a circuit for voice signal enhancement, the circuit comprising at least
   a plurality of microphones, arranged at predefined positions, where each microphone provides a microphone signal;
   a directivity pre-processor circuit, connected with the plurality of microphones to receive microphones signals and configured to provide at least a voice signal and a noise signal;
   a BSS processor circuit, connected with the directivity pre-processor circuit to receive at least the voice signal and the noise signal, and being configured to conduct blind source separation on at least the voice signal and the noise signal to provide at least an enhanced voice signal with reduced noise components; wherein
   the directivity pre-processor circuit is configured to generate a plurality of voice candidate signals and a plurality of noise candidate signals from the microphone signals; wherein each voice candidate signal and each noise candidate signals corresponds to a defined spatial directivity; wherein the voice signal is selected from at least one of the plurality of voice candidate signals and the noise signal is selected from at least one of the plurality of noise candidate signals.

2. The head-worn audio device of claim 1, wherein the directivity pre-processor circuit comprises a microphone definition database and a spatial directivity circuit to generate the plurality of voice candidate signals and the plurality of noise candidate signals.

3. The head-worn audio device of claim 1, wherein the directivity pre-processor circuit is further configured to equalize/normalize at least one of the voice candidate signals and the noise candidate signals.

4. The head-worn audio device of claim 1, wherein the directivity pre-processor circuit further comprises a voice candidate selection circuit, wherein the voice candidate selection circuit is configured to select one of the plurality of voice candidate signals as the voice signal and to provide the voice signal to the BSS processor circuit.

5. The head-worn audio device of claim 4, wherein the voice candidate selection circuit is configured to determine an energy of each of the plurality of voice candidate signals and to select a voice candidate signal having a lowest energy as the voice signal.

6. The head-worn audio device of claim 5, wherein the voice candidate selection circuit is configured to determine the energy of each of the plurality of voice candidate signals in a plurality of sub-bands.

7. The head-worn audio device of claim 1, wherein the directivity pre-processor circuit further comprises a voice filter, configured to filter voice components from each of the plurality of noise candidate signals.

8. The head-worn audio device of claim 7, wherein the voice filter is configured to receive at least one of the plurality of voice candidate signals and to filter the voice components using the received at least one voice candidate signal.

9. The head-worn audio device of claim 1, wherein the directivity pre-processor circuit further comprises a noise candidate selection circuit, wherein the noise candidate selection circuit is configured to select one of the plurality of noise candidate signals as the noise signal and to provide the noise signal to the BSS processor circuit.

10. The head-worn audio device of claim 9, wherein the noise candidate selection circuit is configured to determine an energy of each of the plurality of noise candidate signals and to select a noise candidate signal having a highest energy as the noise signal.

11. The head-worn audio device of claim 10, wherein the noise candidate selection circuit is configured to determine the energy of each of the plurality of noise candidate signals in a plurality of sub-bands.

12. The head-worn audio device of claim 1, wherein the BSS processor circuit is configured to additionally provide an enhanced noise signal with reduced voice components.

13. The head-worn audio device of claim 1, wherein the head worn audio device is formed as one of glasses, a cap, a hat, and a helmet.

14. The head-worn audio device of claim 1, wherein the head worn audio device is a headset.

15. The head-worn audio device of claim 1, comprising at least three microphones.

16. The head-worn audio device of claim 1, further comprising an audio output to transmit at least the enhanced voice signal to further device.

17. A circuit for voice signal enhancement, the circuit being connectable to a plurality of microphones, where each microphone provides a microphone signal, the circuit comprising at least
   a directivity pre-processor circuit, connected with the plurality of microphones to receive microphones signals and configured to provide at least a voice signal and a noise signal; and
   a BSS processor circuit, connected with the directivity pre-processor circuit to receive at least the voice signal and the noise signal, and being configured to conduct blind source separation on at least the voice signal and the noise signal to provide at least an enhanced voice signal with reduced noise components; wherein
   the directivity pre-processor circuit is configured to generate a plurality of voice candidate signals and a plurality of noise candidate signals from the microphone signals; wherein each voice candidate signal and each noise candidate signals corresponds to a defined spatial directivity; wherein the voice signal is selected from at least one of the plurality of voice candidate signals and the noise signal is selected from at least one of the plurality of noise candidate signals.

18. A method of voice signal enhancement based on a plurality of microphone signals of a plurality of microphones, the method comprising directivity pre-processing of the plurality of microphone signals to obtain at least a voice signal and a noise signal; and conducting blind source separation on at least the voice signal and the noise signal to obtain at least an enhanced voice signal with reduced noise components; wherein the directivity pre-processing comprises:

generating a plurality of voice candidate signals and a plurality of noise candidate signals from the plurality of microphones signals;

selecting the voice signal from at least one of the plurality of voice candidate signals; and selecting the noise signal from at least one of the plurality of noise candidate signals.

19. A non-transitory computer-readable medium including contents that are configured to cause a processing device to conduct the method of claim 18.

* * * * *